(12) United States Patent
Wang et al.

(10) Patent No.: US 9,615,080 B2
(45) Date of Patent: Apr. 4, 2017

(54) OBJECT POSITIONING METHOD AND DEVICE BASED ON OBJECT DETECTION RESULTS OF PLURAL STEREO CAMERAS

(71) Applicants: Xin Wang, Beijing (CN); Shengyin Fan, Beijing (CN)

(72) Inventors: Xin Wang, Beijing (CN); Shengyin Fan, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 403 days.

(21) Appl. No.: 14/164,739

(22) Filed: Jan. 27, 2014

(65) Prior Publication Data
US 2014/0218483 A1 Aug. 7, 2014

(30) Foreign Application Priority Data
Feb. 5, 2013 (CN) .......................... 2013 1 0045700

(51) Int. Cl.
| | | |
|---|---|---|
| *H04N 13/02* | (2006.01) | |
| *G06T 7/00* | (2017.01) | |
| *G06T 7/20* | (2017.01) | |
| *H04N 13/00* | (2006.01) | |

(52) U.S. Cl.
CPC ....... *H04N 13/0239* (2013.01); *G06T 7/0077* (2013.01); *G06T 7/2086* (2013.01); *G06T 2207/10021* (2013.01); *H04N 13/0242* (2013.01); *H04N 2013/0081* (2013.01); *H04N 2013/0085* (2013.01)

(58) Field of Classification Search
CPC .......... G06F 17/3079; G06F 17/30811; G06F 17/30831; G06F 17/30858; G06K 9/00369; G06K 9/00771; G08B 13/19645; G06T 7/0077; G06T 7/2086; G11B 27/28; H04N 13/0239

USPC ................................... 348/47, 14.1; 382/103
See application file for complete search history.

(56) References Cited

U.S. PATENT DOCUMENTS

| | | | | |
|---|---|---|---|---|
| 7,646,336 B2 | 1/2010 | Tan et al. | | |
| 2005/0073585 A1* | 4/2005 | Ettinger | ................... | H04N 7/18 348/155 |
| 2008/0300055 A1* | 12/2008 | Lutnick | ............... | G07F 17/3209 463/39 |
| 2008/0316311 A1* | 12/2008 | Albers | ................ | G06F 17/3079 348/143 |

(Continued)

OTHER PUBLICATIONS

Michael Harville, "Stereo Person Tracking with Adaptive Plan-View Templates of Height and Occupancy Statistics," Image and Vision Computing 22 (2004) 127-142, doi:10.1016/j.imavis.2003.07.009.

*Primary Examiner* — Helen Shibru
(74) *Attorney, Agent, or Firm* — Oblon, McClelland, Maier & Neustadt, L.L.P.

(57) ABSTRACT

Disclosed are an object positioning method and an object positioning device based on object detection results of plural stereo cameras. The method comprises a step of obtaining, when each of the plural stereo cameras continuously carries out tracking and detection with respect to each of objects, positional information of the corresponding object; a step of generating, based on the positional information of the corresponding object, a trajectory of the corresponding object; and a step of carrying out a merging process with respect to the trajectories generated corresponding to the plural stereo cameras so as to determine at least one object position.

16 Claims, 6 Drawing Sheets

(56) References Cited

U.S. PATENT DOCUMENTS

| | | | |
|---|---|---|---|
| 2009/0052739 A1* | 2/2009 | Takahashi | G06K 9/00771 382/103 |
| 2009/0276705 A1* | 11/2009 | Ozdemir | G06K 9/00335 715/708 |
| 2010/0253597 A1* | 10/2010 | Seder | B60R 1/00 345/7 |
| 2010/0253599 A1* | 10/2010 | Szczerba | G01S 13/723 345/7 |
| 2011/0085702 A1 | 4/2011 | Nevatia et al. | |
| 2011/0208426 A1 | 8/2011 | Zheng et al. | |
| 2012/0269393 A1* | 10/2012 | Komoto | G06K 9/00342 382/103 |
| 2013/0095959 A1* | 4/2013 | Marty | A63B 24/0003 473/431 |
| 2015/0116487 A1* | 4/2015 | Ptitsyn | H04N 5/23254 348/143 |

* cited by examiner

OBJECT POSITIONING METHOD AND DEVICE BASED ON OBJECT DETECTION RESULTS OF PLURAL STEREO CAMERAS

BACKGROUND OF THE INVENTION

1. Field of the Invention

The present invention generally relates to the field of image processing, and more particularly relates to an object positioning method and an object positing device on the basis of object detection results obtained by plural stereo cameras.

2. Description of the Related Art

At present, a technique carrying out detection and positioning with respect to an object by utilizing a single stereo camera is well known. For example, a paper titled as "Stereo Person Tracking with Adaptive Plan-View Templates of Height and Occupancy Statistics" written by Michael Harville in 2003 discloses this kind of technique.

However, if only one stereo camera is utilized, the view angle of detection is limited, and the rate of detection is not high enough. As a result, plural stereo cameras have been employed for carrying out detection and positioning with respect to an object recently. By using the plural stereo cameras, it is possible to increase the coverage of detection, and more importantly, it is possible to improve the accuracy of detection. However, up to now, the research on how to use the plural stereo cameras to carry out detection and positioning with respect to an object has not been well conducted.

One of the key problems when the plural stereo cameras are employed to carry out detection and positioning with respect to an object is how to merge the results obtained by the plural stereo cameras. When the plural stereo cameras are used to carry out detection and positioning with respect to an object, the view angles of the plural stereo cameras may overlap so that some areas may be captured by more than one stereo camera. That is to say, since each of the plural stereo cameras performs detection and positioning on an object separately, when the object is captured by the plural stereo cameras, it is necessary to conduct a merging process for achieving the combination of the detection results of the same object detected by the respective stereo cameras so as to get a final detection result.

At present, regarding how to carry out the merging process, there are some conventional methods. One of them is performing comparison on the distances between objects on the basis of the detection results obtained by different stereo cameras. If the distances between the objects are very close, then the objects are regarded as corresponding to a same object; otherwise, the objects are regarded as corresponding to different objects. However, in general, since there is an error between a detection result (i.e., a detected position) and its corresponding true position, this kind of method has some problems as shown in FIGS. 1A and 1B as well as FIG. 2.

Figure 1A:
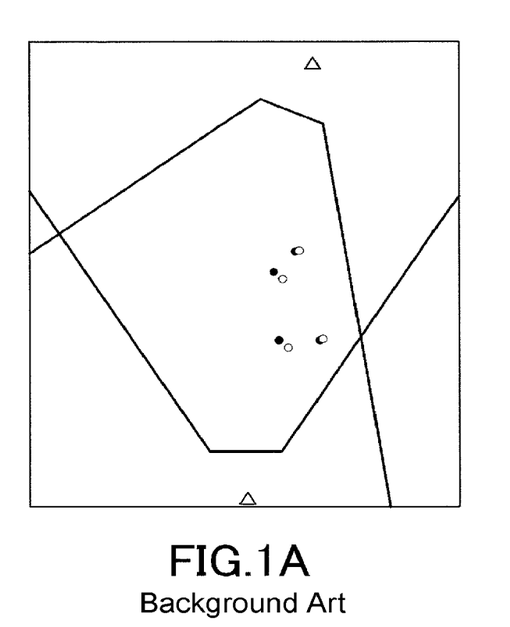
FIG. 1A illustrates, in the world coordinate system, the object detection results of objects in a predetermined space obtained by two stereo cameras.
Figure 1B:
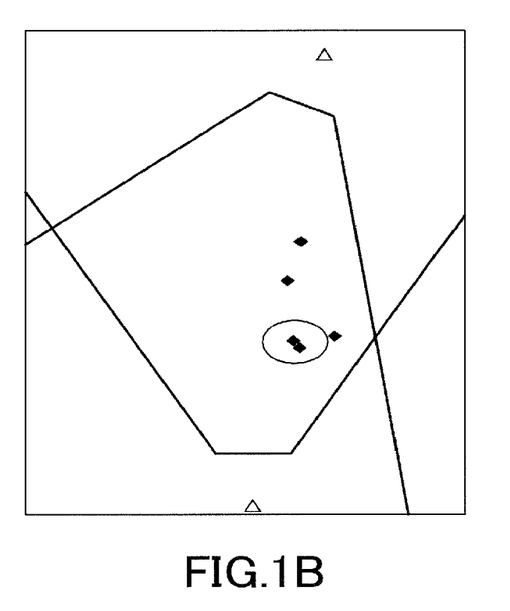
FIG. 1B illustrates an example of a problem occurring when adopting a conventional merging method to carry out a merging process with respect to the objection results shown in FIG. 1.

FIG. 1A illustrates, in the world coordinate system, the detection results of objects in a predetermined space acquired by two stereo cameras. As shown in FIG. 1A, two small triangles on the top and the bottom respectively represent the positions of the two stereo cameras, and two lines (each of them is formed by plural line segments) therein respectively represent the viewing fields of the two stereo cameras. In addition, small circles therein represent the object detection results obtained by one of the two stereo cameras, and black spots therein represent the object detection results obtained by another one of the two stereo cameras. Obviously, the corresponding true result should be that there are four objects in the predetermined space. FIG. 1B illustrates a merging result obtained by adopting a conventional merging method. In FIG. 1B, each of black rhombuses represents a position of a merged object. As a result, according to FIG. 1B, it is apparent that one merged object is incorrectly merged, i.e., one true object becomes two detected objects.

Figure 2:
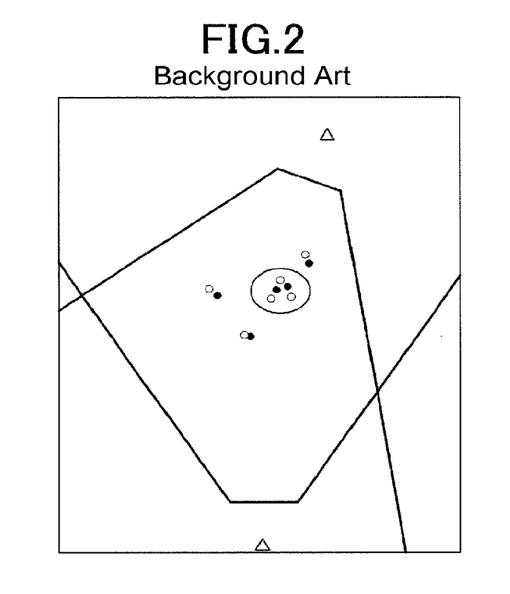
FIG. 2 illustrates, in the world coordinate system, the objection detection results of objects in a predetermined space obtained by two stereo cameras.

FIG. 2 illustrates, in the world coordinate system, the detection results of objects in a predetermined space detected by two stereo cameras. Similar to FIG. 1A, two small triangles on the top and the bottom in FIG. 2 respectively represent the positions of the two stereo cameras, and two lines (each of them is formed by plural line segments) respectively represent the viewing fields of the two stereo cameras. In addition, small circles therein represent the object detection results of one the two stereo cameras, and black spots therein represent the object detection results of another one of the two stereo cameras. According to FIG. 2, it is obvious that in a small range therein, there are three small circles and two black spots are very close to each other. In this kind of case, it is very difficult to determine to which objects the three small circles and the two black spots correspond.

As a result, it is necessary to develop a kind of technique by which the above-described problems can be avoided when carrying out detection and positioning with respect to an object by employing plural stereo cameras, so as to be able to accurately detect and locate the object.

SUMMARY OF THE INVENTION

The above-described problems occur because the comparison is carried out only between two single-frame images captured by the two stereo cameras. In other words, when carrying out the merging of the object detection results obtained by the two stereo cameras, only the corresponding spatial relationship is considered. On the basis of this kind of cognition, the inventors of the present invention propose a new method of detecting and positioning an object by using the object detection results obtained by plural stereo cameras. In this method, comparison is not carried out between the object detection results on the basis of single frames obtained by the respective stereo cameras, but is carried out between the trajectories respectively generated on the basis of the object detection results on the basis of plural frames obtained by the plural stereo cameras. Here it should be noted that a trajectory refers to a point set formed by the detection results on the basis of plural frames, and the trajectory may indicate not only a space-region relationship but also a time-region relationship. As a result, this kind of method is more stable. In addition, by utilizing these kinds of trajectories to carry out a merging process when adopting plural stereo cameras to carry out detection and positioning with respect to an object, it is possible to solve the above-described problems.

According to one aspect of the present invention, an object positioning method based on object detection results of plural stereo cameras is provided. The object positioning method comprises a step of obtaining, when each of the plural stereo cameras continuously carries out detection with respect to each of objects, positional information of the corresponding object; a step of generating, based on the positional information of the corresponding object, a trajectory of the corresponding object; and a step of carrying out a merging process with respect to the trajectories corresponding to the plural stereo cameras so as to determine object positions.

According to another aspect of the present invention, an object positioning device based on objection results of plural stereo cameras is provided. The object positioning device comprises a positional information obtention part configured to obtain, when each of the plural stereo cameras continuously carries out detection with respect to each of objects, positional information of the corresponding object; a trajectory generation part configured to generate, based on the positional information the corresponding object, a trajectory of the corresponding object; and a positioning part configured to carry out a merging process with respect to the trajectories corresponding to the plural stereo cameras so as to determine object positions.

DETAILED DESCRIPTION OF THE PREFERRED EMBODIMENTS

In order to let those people skilled in the art better understand the present invention, hereinafter the present invention will be concretely described on the basis of the drawings and various embodiments.

First, it should be noted that as a precondition of applying an object positioning technique on the basis of the object detection results obtained by plural stereo cameras according to the embodiments of the present invention, it is assumed that each of the coordinate systems of all the stereo cameras has been converted into the world coordinate system in which the X-Z plane is parallel to the ground surface, and the Y-axis indicates the height from the ground surface. Furthermore, since how to carry out the conversion is a well-known technique in the art, the related descriptions are omitted here. Moreover, in the following descriptions, the mentioned positional coordinates refer to those in the world coordinate system.

In addition, the present invention is suitable for a case in which two or more than two stereo cameras are utilized. However, for the sake of convenience, in the following embodiments of the present invention, only two stereo cameras are taken for illustration.

Figure 3:
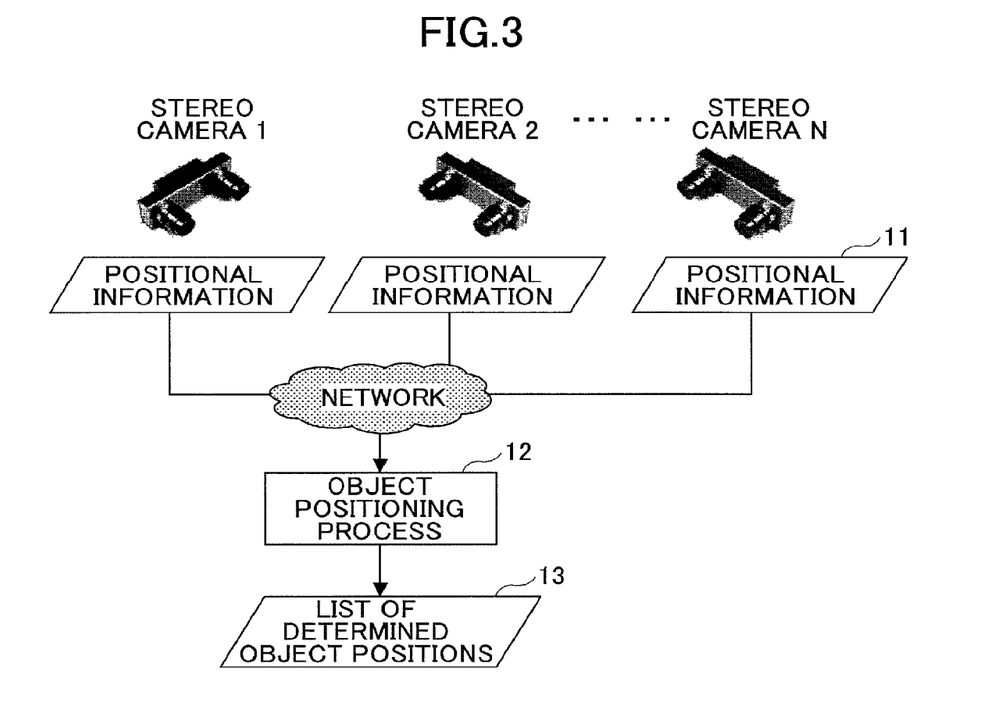
FIG. 3 illustrates a system in which an object positioning technique according to an embodiment of the present inventions is utilized.

In what follows, on the basis of FIG. 3, a system in which an object positioning technique on the basis of the object detection results obtained by plural stereo cameras according to an embodiment of the present invention is illustrated. As shown in FIG. 3, this system includes plural two-lens stereo cameras. As for each of the plural two-lens stereo cameras, a captured video frame is processed by employing object detection and tracking so as to generate positional information 11 of the corresponding object. Here it should be noted that this kind of object detection and tracking may adopt a well-known technique in the art. For example, a method disclosed in the paper titled as "Stereo Person Tracking with Adaptive Plan-View Templates of Height and Occupancy Statistics" written by Michael Harville in 2003 may be adopted in the present invention. After that, the generated positional information 11 is sent to an object positioning device 12 according to the embodiments of the present invention in a wireless or wired way. The object positioning device 12 carries out the object positioning method according to the embodiments of the present invention with respect to the positional information 11 corresponding to the plural stereo cameras so as to determine the final object positions of the respective objects. Furthermore, on the basis of need, it is also possible to output a list 13 including the determined final positions of the respective objects.

As described above, what the positional information 11 indicates is the position of the corresponding object in the world coordinate system. For the sake of convenience, the format of the positional information 11 is defined as follows.

$$\text{Data} := \left\{ \text{timestamp}, \underbrace{(id_1, Xw_1, Yw_1, Zw_1)}_{object_1}, \right. \quad (1)$$

$$\left. \underbrace{(id_2, Xw_2, Yw_2, Zw_2)}_{object_2}, \ldots, \underbrace{(id_m, Xw_m, Yw_m, Zw_m)}_{object_m} \right.$$

Here, Data refers to the positional information 11 serving as a detection result; timestamp refers to a timestamp, and indicates a particular time point at which a stereo camera captures a video frame; m refers to the number of detected objects; $id_j$ (j=0, 1, ..., m) refers to each of the indexes of the detected objects; and $X_{Wj}$, $Y_{Wj}$, and $Z_{Wj}$ refer to the three-dimensional coordinates of the head (the top part) of an object j in the world coordinate system, wherein, $X_{Wj}$ and $Z_{Wj}$ refer to the position of the projection point of the object j on the ground surface, and $Y_{Wj}$ refers to the height of the object j from the ground surface. Here it should be noted that the positional information 11 may adopt any other proper format, and the above defined format is just an example for illustration. For example, it is also possible to adopt a format on the basis of two-dimensional coordinates. In other words, the $Y_W$ coordinate may be omitted, and only the $X_W$ and $Z_W$ coordinates which indicate the position of the projection point of the corresponding object on the ground surface are utilized to represent the position of the corresponding object.

First Embodiment

Figure 4:
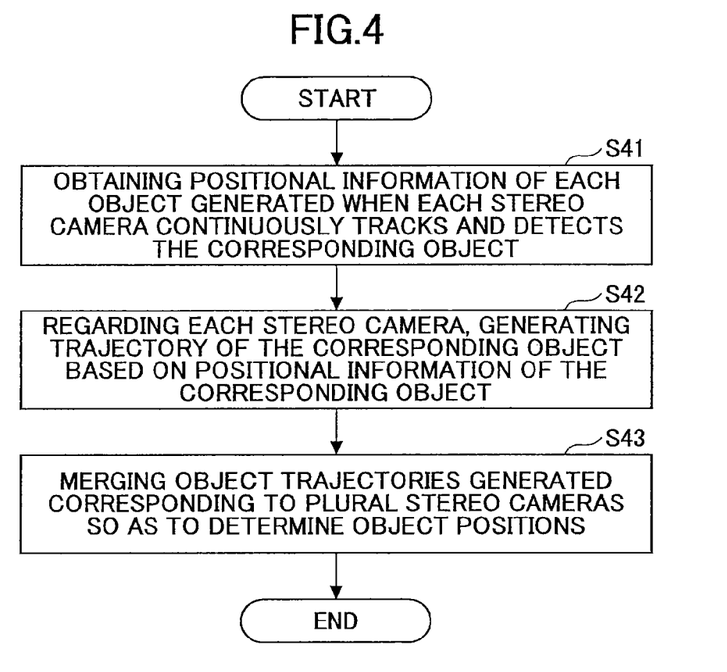
FIG. 4 is a flowchart of an object positioning method on the basis of the object detection results of plural stereo cameras according to a first embodiment of the present invention.

FIG. 4 is a flowchart of an object positioning method on the basis of the object detection results obtained by plural stereo cameras according to a first embodiment of the present invention.

As shown in FIG. 4, in STEP S41, the positional information of each object generated when each of plural stereo cameras continuously carries out tracking and detection with respect to the corresponding object is obtained.

Since each of the plural stereo cameras continuously carries out the tracking and detection, as for the corresponding object tracked and detected by the corresponding stereo camera, the positional information corresponding to plural time points may be obtained. For example, when a case in which two stereo cameras A and B are used to carry out the tracking and detection is taken as an example, by adopting the format expressed by the above equation (1), it is possible to obtain a positional information list generated when the stereo camera A carries out the tracking and detection as follows.

$$\{t_{A0}, (id_{A1}, Xw^0_{A1}, Yw^0_{A1}, Zw^0_{A1}), (id_{A2}, Xw^0_{A2}, Yw^0_{A2}, Zw^0_{A2}), \ldots,\},$$
$$\{t_{A1}, (id_{A1}, Xw^1_{A1}, Yw^1_{A1}, Zw^1_{A1}), (id_{A2}, Xw^1_{A2}, Yw^1_{A2}, Zw^1_{A2}), \ldots,\},$$
$$\{t_{A2}, (id_{A1}, Xw^2_{A1}, Yw^2_{A1}, Zw^2_{A1}), (id_{A2}, Xw^2_{A2}, Yw^2_{A2}, Zw^2_{A2}), \ldots,\},$$
$$\ldots,$$
$$\{t_{An}, (id_{A1}, Xw^n_{A1}, Yw^n_{A1}, Zw^n_{A1}), (id_{A2}, Xw^n_{A2}, Yw^n_{A2}, Zw^n_{A2}), \ldots,\} \quad (2)$$

Here $t_{Ai}$ (i=0, 1, ..., n) refers to each of the timestamps in an order of time, and $Xw^i_{Ai}$, $Yw^i_{Ai}$, and $Zw^i_{Ai}$ refer to the three-dimensional coordinates of the head (the top part) of an object Ai in the world coordinate system at the time point $t_{Ai}$. It should be noted that in a tracking and detection process, a new object may enter the detection area, or an existing object may depart from the detection area. As a result, in difference frames, the number of the detected objects and the particularly detected objects may vary.

Similarly, the positional information generated by the stereo camera B when the stereo camera B carries out the tracking and detection is as follows.

$$\{t_{B0}, (id_{B1}, Xw^0_{B1}, Yw^0_{B1}, Zw^0_{B1}), (id_{B2}, Xw^0_{B2}, Yw^0_{B2}, Zw^0_{B2}), \ldots,\},$$
$$\{t_{B1}, (id_{B1}, Xw^1_{B1}, Yw^1_{B1}, Zw^1_{B1}), (id_{B2}, Xw^1_{B2}, Yw^1_{B2}, Zw^1_{B2}), \ldots,\},$$
$$\{t_{B2}, (id_{B1}, Xw^2_{B1}, Yw^2_{B1}, Zw^2_{B1}), (id_{B2}, Xw^2_{B2}, Yw^2_{B2}, Zw^2_{B2}), \ldots,\},$$
$$\ldots,$$
$$\{t_{Bn}, (id_{B1}, Xw^n_{B1}, Yw^n_{B1}, Zw^n_{B1}), (id_{B2}, Xw^n_{B2}, Yw^n_{B2}, Zw^n_{B2}), \ldots,\} \quad (3)$$

In STEP S42, as for each of the plural stereo cameras, a trajectory of the corresponding object tracked and detected by the corresponding stereo camera is created on the basis of the corresponding positional information generated as above.

Figure 9:
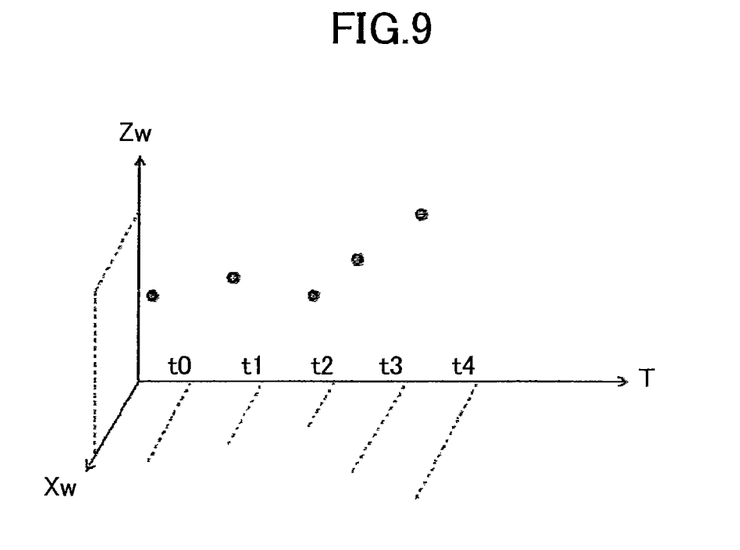
FIG. 9 illustrates an example of a trajectory in a two-dimensional space.

One trajectory corresponds to one object, and is formed by the positional information at plural detection time points of this object. For example, FIG. 9 illustrates an example of a trajectory in a two-dimensional space (in fact, what one trajectory indicates is a set of three-dimensional positions in a predetermined time period; however, for the sake of convenience, FIG. 9 only illustrates a two-dimensional case). In FIG. 9, the horizontal axis refers to time, and each of plural black spots refers to a position at the corresponding time point; this position is obtained by projecting a position in a three-dimensional coordinate system onto the ground surface (a Xw-Zw plane).

Here it should be noted that as for each of the plural stereo cameras, the number of trajectories created by the corresponding stereo camera should be the same as the number of objects tracked and detected by the corresponding stereo camera. In this embodiment, the format of the object trajectory is defined as follows.

$$\text{Trajectory} := \{id, (t_1, Xw^1_{id}, Yw^1_{id}, Zw^1_{id}), (t_2, Xw^2_{id}, Yw^2_{id}, Zw^2_{id}), \ldots, (t_n, Xw^n_{id}, Yw^n_{id}, Zw^n_{id})\} \quad (4)$$

Here Trajectory refers to a created object trajectory; id refers to a number of a tracked and detected object; $t_i$ (i=0, 1, ..., n) refers to each of timestamps in an order of time; $Xw^i_{id}$, $Yw^i_{id}$, and $Zw^i_{id}$ refer to the positional coordinates of the object id in the world coordinate system at the time point $t_i$.

Taking account of the amount and time of calculation necessary for the object positioning method according to this embodiment of the present invention as well as the acceptable delay when outputting the object position determined by the object positioning method, as a preferred example of the present invention, it is possible to only create a trajectory corresponding to a predetermined time period. In what follows, the preferred example of the present invention is illustrated on the basis of FIG. 5.

Figure 5:
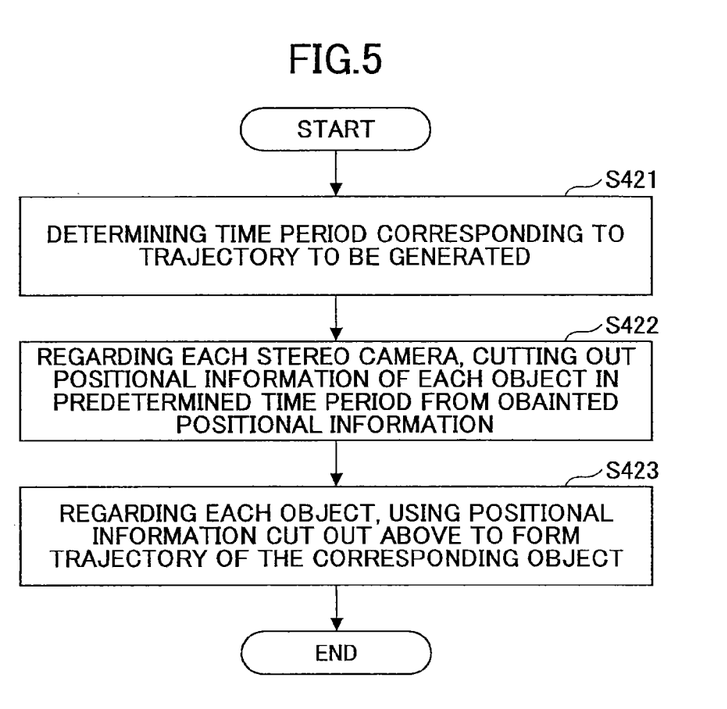
FIG. 5 is a flowchart of an example of how to generate a trajectory corresponding to a predetermined period of time in the first embodiment of the present invention.

FIG. 5 is a flowchart of an example of how to create a trajectory corresponding to a predetermined time period in this embodiment.

First, in STEP S421, a time period corresponding to a trajectory to be created is determined. The time period may be determined on the basis of an actual circumstance. For example, a probable time period may be 1 second. Here it should be noted that his probable time period is the above-mentioned acceptable time period, and at the same time, in this probable time period, it is possible to obviously observe the movement of an object.

After that, in STEP S422, as for each of the plural stereo cameras, a cut-out operation is carried out for cutting out the positional information of the corresponding object tracked and detected by the corresponding stereo camera in the probable (predetermined) time period from the positional information generated as above.

In this step, as for the position information tracked and detected by each of the plural stereo cameras, the above-described cut-out operation is carried out. According to the timestamps included in the positional information, it is possible to determine the positional information which should be cut out. For example, in a case where the stereo camera A is taken as an example, the positional information corresponding to the stereo camera A is expressed as the above equation (2). Accordingly, it is necessary to find a timestamp $t_{Ai}$ (0≤i<0) so as to satisfy the following equation.

$$(t_{An} - t_{Ai}) \leq \text{Time Length and } (t_{An} - t_{A(i-1)}) > \text{Time Length} \quad (5)$$

Here $t_{An}$ refers to a newest timestamp in the positional information tracked and detected by the stereo camera A.

If $t_{Ai}$ satisfying the above equation (5) is found, then in the follow-on step, the data (the positional information) from the time point $t_{Ai}$ to the time point $t_{An}$ is used to form a trajectory; otherwise, that means the positional information tracked and detected by the stereo camera A is insufficient, and it is impossible to form the trajectory. As a result, in the latter case, it is necessary to let the stereo camera A continue the tracking and detection.

Finally, in STEP S423, as for the corresponding object tracked and detected by each of the stereo cameras, the positional information cut out as above is adopted to form a trajectory.

FIG. 4 is referred to again. After the object trajectories are created, in STEP S43, object positions are determined by merging the object trajectories created corresponding to the different stereo cameras. To speak more apparently, in this step, the detection results (the trajectories) with regard to a same object tracked and detected by the different stereo cameras are merged so as to finally determine the position of this object.

This step may be carried out by carrying out the following particular operations, namely, matching the object trajectories created corresponding to the different stereo cameras so that as for each object, plural matched trajectories of the corresponding object are determined; merging, if the number of the matched trajectories of the corresponding object is plural, the newest positional information of the plural matched trajectories so as to determine the position of the corresponding object; and determining, if the number of the matched trajectories of the corresponding object is one, the positional information of this trajectory as the position of the corresponding object.

Here it should be noted that the above-described operations may be achieved by various proper means. In what follows, by referring to FIG. 6, a particular method is given by which the above-described operations may be achieved. In addition, this particular method is not used to limit the present invention.

Figure 6:
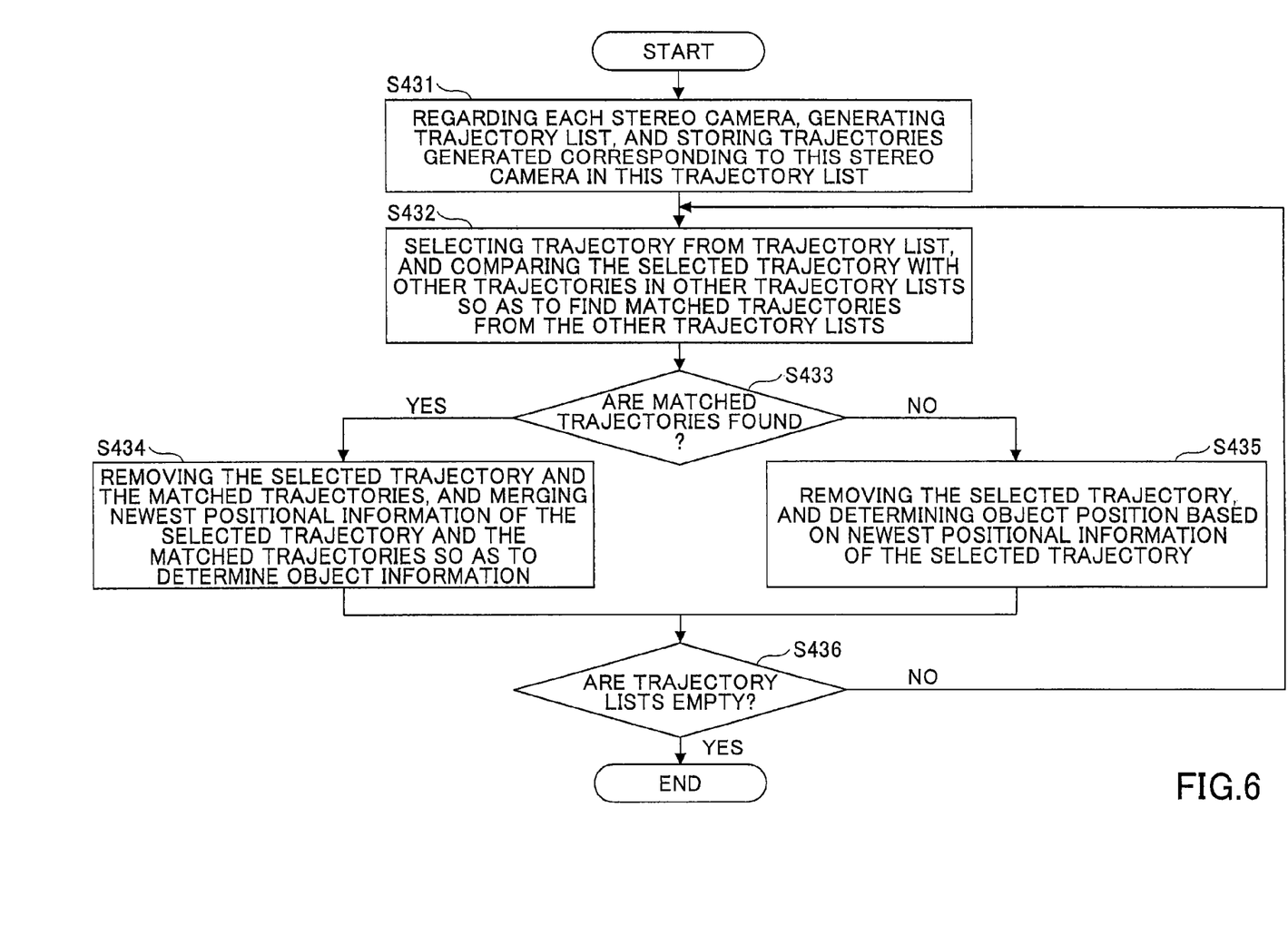
FIG. 6 is a flowchart of an example of how to merge trajectories corresponding to plural stereo cameras so as to determine object positions in the first embodiment of the present invention.

FIG. 6 is a flowchart of an example of how to merge trajectories corresponding to plural stereo cameras so as to determine object positions in the first embodiment of the present invention.

As shown in FIG. 6, in STEP S431, regarding each of the plural stereo cameras, a trajectory list is generated, and various trajectories generated corresponding to this stereo camera are stored in this trajectory list. For example, as for the stereo camera A, a trajectory list A is generated, and the trajectories generated in the above STEP S42 corresponding to the objects tracked and detected by the stereo camera A are stored in the trajectory list A. Similarly, as for the stereo camera B, a trajectory list B is generated, and the trajectories generated in the above STEP S42 corresponding to the objects tracked and detected by the stereo camera B are stored in the trajectory list B.

In STEP S432, a trajectory is selected from a trajectory list, and the selected trajectory is compared with other trajectories stored in other trajectory lists so as to find trajectories which match the selected trajectory.

For example, when a Trajectory$_a$ is selected from a trajectory list A, the selected Trajectory$_a$ is compared with trajectories stored in trajectory lists B, C, . . . , N in sequence so as to find, from the trajectory lists B, C, . . . , N, all trajectories which match the selected Trajectory$_a$.

After that, in STEP S433, it is determined whether there is a trajectory in the other trajectory lists which matches the selected trajectory. If it is determined that there is a matched trajectory, then the process of this method goes to STEP S434; otherwise, the process goes to STEP S435.

In STEP S434, the selected trajectory and the trajectories which match the selected trajectory are removed from the corresponding trajectory lists. After that, the newest positional information of the selected trajectory and the trajectories which match the selected trajectory are merged so as to determine the position of the corresponding object.

For example, it is assumed that by carrying out STEP S432, only Trajectory$_b$ in the trajectory list B is determined as one which matches the selected Trajectory$_a$, and Trajectory$_a$ and Trajectory$_b$ correspond to a same object Object1 and satisfy the following equations.

$$\text{Trajectory}_a := \{id_a, (t_1, Xw_a^1, Yw_a^1, Zw_a^1), (t_2, Xw_a^2, Yw_a^2, Zw_a^2), \ldots, (t_n, Xw_a^n, Yw_a^n, Zw_a^n)\}$$

$$\text{Trajectory}_b := \{id_b, (t_1, Xw_b^1, Yw_b^1, Zw_b^1), (t_2, Xw_b^2, Yw_b^2, Zw_b^2), \ldots, (t_n, Xw_b^n, Yw_b^n, Zw_b^n)\} \quad (6)$$

In this case, in STEP S434, Trajectory$_b$ is removed from the trajectory list B, and Trajectory$_a$ is removed from the trajectory list A.

On the other hand, since the determined trajectories in the above STEP S431 are matched, and because the newest position of the corresponding object is to be determined finally, in this step, only the matched trajectories determined in the above step are merged. For example, it is possible to adopt the following equation (7) to carry out merging so as to determine the newest position of the corresponding position.

$$\tilde{p}_n = \left( \frac{Xw_a^n + Xw_b^n}{2}, \frac{Yw_a^n + Yw_b^n}{2}, \frac{Zw_a^n + Zw_b^n}{2} \right) \quad (7)$$

Here $\tilde{p}_n$ refers to the newest position of the corresponding object Object1 determined by carrying out merging.

In STEP S435, the selected trajectory is removed from the corresponding trajectory list, and on the basis of the selected trajectory, the newest position of the corresponding object is determined.

For example, if it is assumed that in STEP S432, it is determined that there isn't a trajectory in the other trajectory lists which matches the selected Trajectory$_a$, then the selected Trajectory$_a$ is removed from the trajectory list A, and for example, the newest position $(Xw_a^n, Yw_a^n, Zw_a^n)$ of the selected Trajectory$_a$ is determined as the position of the corresponding object.

After that, in STEP S436, it is determined whether the respective trajectory lists are not empty. If it is determined that they are not empty, then the above STEPS S432 to S435 are carried out repeatedly; otherwise, the process of this method finishes.

In what follows, a trajectory matching method adopted in this embodiment of the present invention is given. Here it should be noted that it is possible to determine whether or not two trajectories match, by adopting any proper conventional method, for example, a method on the basis of an average distance value or a correlation coefficient. However, in this embodiment of the present invention, whether or not the two trajectories are matched is determined by calculating a correlation coefficient between two trajectories. In addition, it is possible to access http//en.wikipedia.org/wiki/Correlation for more information about the calculation of a correlation coefficient. In this embodiment, a trajectory may also be regarded as a set of values. As a result, if two trajectories matches, they should have a strong linear relationship, i.e., have a high correlation coefficient (its maximum value is 1); otherwise, they have a low correlation coefficient. As well known, a method on the basis of a correlation coefficient is an important method of carrying out color histogram matching in the field of image processing. In this embodiment, trajectory matching is carried out by introducing a calculation equation of a correlation coefficient into the three-dimensional world coordinate system. In what follows, it will be described in particular.

$$r_{ab} = \frac{\sum_{i=1}^{n} d(p_a^i, \bar{p}_a) * d(p_b^i, \bar{p}_b)}{\sqrt{\sum_{i=1}^{n} d(p_a^i, \bar{p}_a)^2 * \sum_{i=1}^{n} d(p_b^i, \bar{p}_b)^2}} \quad (8)$$

Here $r_{ab}$ refers to a correlation coefficient. If $r_{ab}$ is greater than a predetermined threshold value (for example, 0.95), then it is possible to regard the corresponding two trajectories as correlated. $P_a^i$ and $P_b^i$ refer to the positional coordinate values of Trajectory$_a$ and Trajectory$_b$ at a time point $t_i$, respectively. $\bar{p}_a$ refers to the average positional coordinate value corresponding to Trajectory$_a$, calculated by utilizing the following equation (9). $\bar{p}_b$ refers to the average positional coordinate value corresponding to Trajectory$_b$, calculated by utilizing the following equation (9). Each of $d(p_a^i, \bar{p}^a)$ and $d(p_b^i, \bar{p}_b)$ refers to the distance between two positions calculated by utilizing the following equation (10).

$$\bar{p} = (\bar{X}_w, \bar{Y}_w, \bar{Z}_w) = \left(\frac{1}{n}\sum_{i=1}^{n} X_w^i, \frac{1}{n}\sum_{i=1}^{n} Y_w^i, \frac{1}{n}\sum_{i=1}^{n} Z_w^i\right) \quad (9)$$

Here, $\bar{X}_w$, $\bar{Y}_w$, and $\bar{Z}_w$ refer to average positional coordinate values in the world coordinate system. It should be noted that $\bar{p}$ is a vector.

$$d(p,p') = \sqrt{(X_w - X_w')^2 + (Y_w - Y_w')^2 + (Z_w - Z_w')^2} \quad (10)$$

Here p and p' refer to two vectors in the world coordinate system.

Up to here, the particular example of how to determine the position of an object by merging object trajectories corresponding to different stereo cameras on the basis of FIG. 6 has been described in particular. By referring to the above process based on FIG. 6, as for an object, it is possible to determine its position by merging the object trajectories corresponding to different stereo cameras. However, as described above, the method based on FIG. 6 is just an example; that is to say, those people skilled in the art may carry out various modifications with respect to this method.

For example, in the above STEPS S434 and S435, it is also possible not to remove the respective trajectories from the corresponding trajectory lists, but to mark them as ones that have been handled. Accordingly, in STEP S436, the above STEPS S423 to S435 are carried out repeatedly until all the trajectories in the respective trajectory lists are marked as handled. Again, for example, in the above STEP S432, it is also possible to select each trajectory in the plural trajectory list in order, and the selected corresponding trajectory is compared with the other trajectories stored in the other trajectory lists. After that, in the follow-on STEPS S434 and S435, the selected corresponding trajectory and the trajectories that match the selected corresponding trajectory are not removed from the corresponding trajectory lists. Finally, in STEP S436, the above STEPS S432 to S435 are carried out repeatedly until all the trajectories are selected in the above STEP S432. According to this kind of method, all the trajectories are handled, and each trajectory of each stereo camera may be compared with the other trajectories of other stereo cameras.

Again, for example, in the above STEP S434, it is also possible to perform another calculation method, for example, a weighted averages method on the newest positions of plural trajectories so as to carry out merging.

Again, for example, in order to improve the accuracy of detection and obtain a more accurate object position, before carrying out STEP S432, it is also possible to conduct the following additional step, namely, removing an incomplete trajectory. Here it should be noted that the so-called "incomplete trajectory" indicates that the amount of positional information forming this trajectory is small. In addition, it is easily understood that if an object is successfully and continuously tracked and detected in the above-described predetermined time period, then there should be a positional information of this object at each timestamp in the predetermined time period. On the contrary, if an object is not successfully and continuously tracked and detected in the above-described time period, for example, if at some timestamps in the above predetermined time period, the position information of the object cannot be tracked and detected, then that means the generated trajectory is formed by a small amount of positional information. If the amount of positional information forming a trajectory is too small, then the accuracy of the object position determined by utilizing this kind of trajectory is lower. As a result, it is necessary to remove this kind of trajectory in advance so that it is possible not to take into account this kind of trajectory when carrying out merging of trajectories. In addition, it is also possible to predetermine a threshold value on the basis of actual needs. After that, for example, if the number of timestamps in the predetermined time period at which the positional information cannot be tracked and detected is greater than the predetermined threshold value, then it may be determined that the generated trajectory is an incomplete trajectory. In particular, if a stereo camera tracks and detects an object by a capture rate of 30 frames per second, and the length of the predetermined time period is 1 second, then the number of valid timestamps may be determined to be at least 20. Here it should be noted that a valid timestamp indicates at this timestamp, it is possible to track and detect the positional information of the corresponding object.

In the object positioning method according to the first embodiment of the present invention, the trajectories generated on the basis of plural detection results obtained by plural stereo cameras are compared. In this way, not only the region of space is considered but also the region of time is considered. As a result, it is possible to solve the problems described in the Field of the Invention so as to improve the detection accuracy and to obtain more accurate objection positions.

Second Embodiment

In what follows, an object positioning method according to a second embodiment of the present invention is illustrated.

The object positioning method according to the second embodiment of the present inventions is similar to the object positioning method according to the first embodiment of the present invention. The difference of the two is that after trajectories are generated in the above STEP S42, timestamp resampling synchronization is carried out. For example, two trajectories expressed by the above equation (6) correspond to the stereo cameras A and B, and they have the same data length n. However, since the capture rates as well as the tracking and detection rates of the two stereo cameras A and B are different, it is impossible to guarantee that the timestamp $t_i$ in the trajectory Trajectory$_a$ is totally the same as the timestamp $t_i$ in the trajectory Trajectory$_b$. If the capture rates of the respective stereo cameras are high, then it is possible to consider that this kind of timestamp difference may have less influence on the finally obtained positioning result, i.e., may be ignored. On the contrary, if the capture rates of the respective stereo cameras are not high enough, then the difference of timestamps may have big influence on the finally obtained positioning result. As a result, in order to let the positioning result be more accurate, it is necessary to utilize a timestamp resampling method to let the obtained data be synchronized.

First, timestamps $ts_1, ts_2, \ldots, ts_{n-1}$ for resampling are predetermined. After that, as for the trajectories Trajectory$_a$ and Trajectory$_b$, the positional information forming them are utilized to calculate the positional coordinates at the predetermined timestamps for resampling. The trajectories Trajectorya and Trajectoryb after the timestamp resampling synchronization are expressed as follows.

$$\text{Trajectory}_a := \{id_a, (t_{s1}, Xw_a^{s1}, Yw_a^{s1}, Zw_a^{s1}), (t_{s2}, Xw_a^{s2}, Yw_a^{s2}, Zw_a^{s2}), \ldots, (t_{sn-1}, Xw_a^{sn-1}, Yw_a^{sn-1}, Zw_a^{sn-1})\}$$

$$\text{Trajectory}_b := \{id_b, (t_{s1}, Xw_b^{s1}, Yw_b^{s1}, Zw_b^{s1}), (t_{s2}, Xw_b^{s2}, Yw_b^{s2}, Zw_b^{s2}), \ldots, (t_{sn-1}, Xw_b^{sn-1}, Yw_b^{sn-1}, Zw_b^{sn-1})\} \quad (11)$$

Here it should be noted that it is possible to utilize any proper method to calculate the positional coordinates at the predetermined timestamps, for example, a prediction method on the basis of historic information, a linear interpolation method, or a quadratic interpolation method. In this embodiment, the linear interpolation method is utilized to carry out calculation. When this kind of method is adopted, as for the trajectory Trajectory$_a$, the positional coordinates at the predetermined timestamps for resampling are expressed as follows.

$$\begin{cases} Xw_a^{si} = \frac{t_{si} - t_i}{t_{i+1} - t_i} * Xw_a^j + \frac{t_{i+1} - t_{si}}{t_{i+1} - t_i} * Xw_a^{j+1} \\ Yw_a^{si} = \frac{t_{si} - t_i}{t_{i+1} - t_i} * Yw_a^j + \frac{t_{i+1} - t_{si}}{t_{i+1} - t_i} * Yw_a^{j+1} \\ Zw_a^{si} = \frac{t_i - t_i}{t_{i+1} - t_i} * Zw_a^j + \frac{t_{i+1} - t_{si}}{t_{i+1} - t_i} * Zw_a^{j+1} \end{cases} \quad (12)$$

Here $t_{si}$ refers to a timestamp for resampling, $Xw_a^{si}$, $Yw_a^{si}$, and $Zw_a^{si}$ refer to positional coordinates corresponding to the timestamp, and $t_i$ and $t_{i+1}$ refer to existing timestamps in front and behind and adjacent to $t_{si}$.

Similarly, as for the trajectory Trajectory$_{b1}$, it is also possible to adopt one similar to the equation (12) to calculate the positional coordinates at the predetermined timestamps.

As a result, it is possible to utilize the predetermined timestamps for resampling and the positional coordinates at the predetermined timestamps to form the trajectory of the corresponding object. In this way, it is possible to guarantee that the timestamps in the respective trajectories are totally the same.

Third Embodiment

Figure 7:
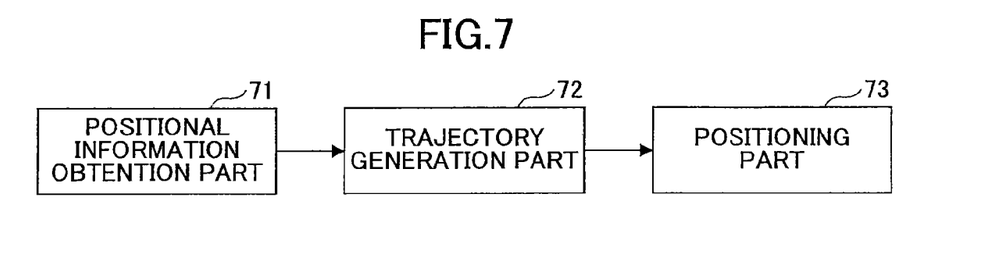
FIG. 7 is a block diagram of an object positioning device on the basis of the objection detection results of plural stereo cameras according to a third embodiment of the present invention.

FIG. 7 is a block diagram of an object positioning device on the basis of the objection detection results obtained by plural stereo cameras according to a third embodiment of the present inventions.

As shown in FIG. 7, the object positioning device comprises a positional information obtention part 71 configured to obtain positional information of objects generated when the plural stereo cameras continuously carry out tracking and detection with respect to the objects; a trajectory creation part 72 configured to create trajectories of the respective objects on the basis of the generated positional information corresponding to the plural stereo cameras; and a positioning part 73 configured to determine object positions by merging the created trajectories of the objects corresponding to the plural stereo cameras.

Fourth Embodiment

The present invention may also be achieved by an object positioning system on the basis of the object detection results of plural stereo cameras.

Figure 8:
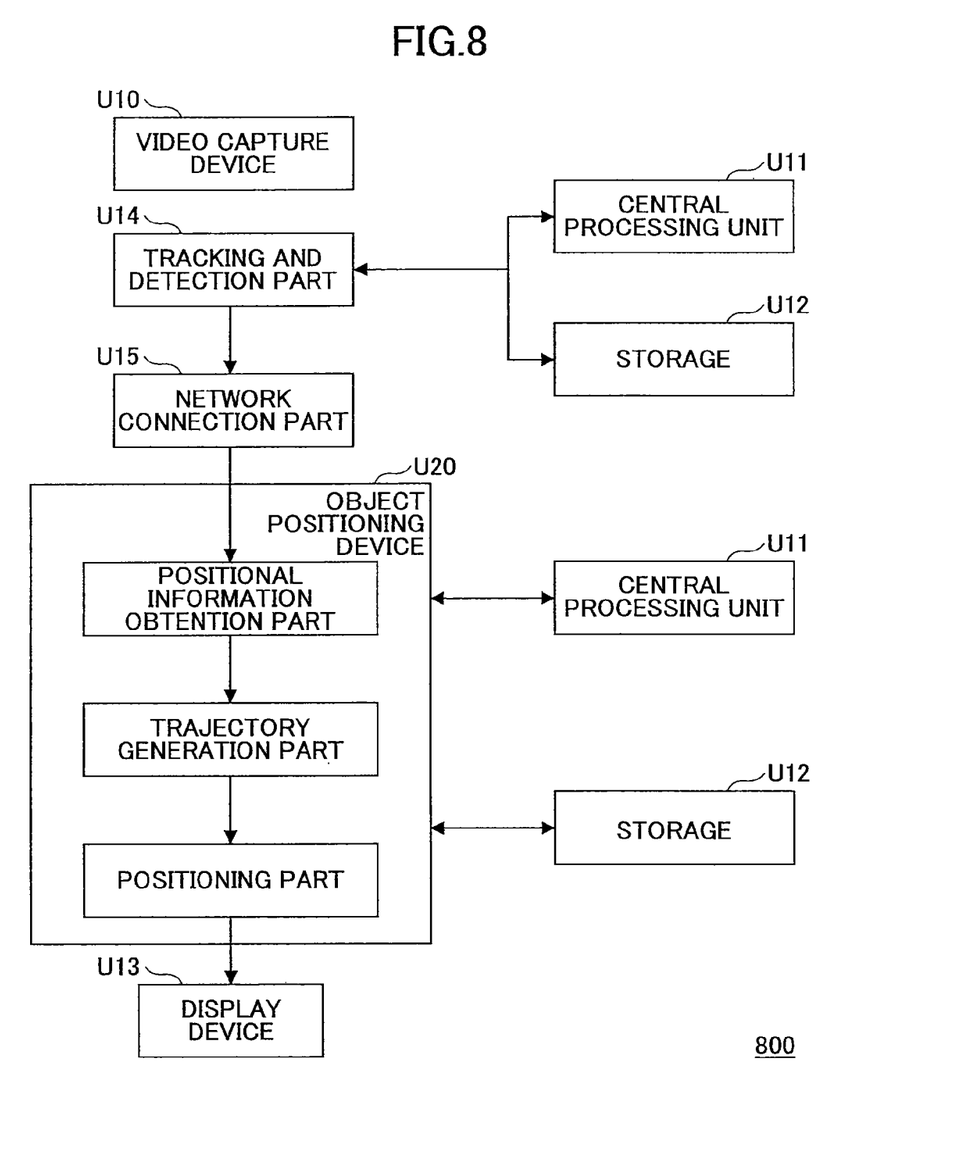
FIG. 8 is a hardware block diagram of an object positioning system configured on the basis of the objection detection results of plural stereo cameras according to a fourth embodiment of the present invention.

FIG. 8 is a hardware block diagram of an object positioning system on the basis of the objection detection results obtained by plural stereo cameras according to a fourth embodiment of the present invention.

As shown in FIG. 8, the object positioning system 800 comprises a video capture device U10 configured to capture video, wherein, the video capture device U10 may be achieved by, for example, plural stereo cameras; a tracking and detection part U14 configured to generate positional information of objects on the basis of the captured video, wherein, the tracking and detection part U14 may carry out processing together with, for example, a central processing unit and a memory of a computer; a network connection part U15 configured to adopt a proper network protocol so as to send in a wired or wireless way the generated positional information of the objects to an object positioning device U20; the object positioning device U20 configured to carry out an object positing method according to the embodiment of the present invention; and an output device U13 configured to output object positions determined on the basis of the object detection results of the plural stereo cameras to the outside, wherein, the output device U13 may be achieved by, for example, a display or a printer. The object positioning device U20 includes a positional information obtention part, a trajectory creation part, and a positioning part.

Here it should be noted that the above respective embodiments are just exemplary ones, and the specific structure and operation of each of them may not be used for limiting the present invention.

Moreover, the embodiments of the present invention may be implemented in any convenient form, for example, using dedicated hardware, or a mixture of dedicated hardware and software. The embodiments of the present invention may be implemented as computer software implemented by one or more networked processing apparatuses. The network may comprise any conventional terrestrial or wireless communications network, such as the Internet. The processing apparatuses may comprise any suitably programmed apparatuses such as a general purpose computer, personal digital assistant, mobile telephone (such as a WAP or 3G-compliant phone) and so on. Since the embodiments of the present invention can be implemented as software, each and every aspect of the present invention thus encompasses computer software implementable on a programmable device.

The computer software may be provided to the programmable device using any storage medium for storing processor-readable code such as a floppy disk, a hard disk, a CD ROM, a magnetic tape device or a solid state memory device.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of storing a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

While the present invention is described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on and claims the benefit of priority of Chinese Priority Patent Application No. 201310045700.8 filed on Feb. 5, 2013, the entire contents of which are hereby incorporated by reference.

What is claimed is:

1. An object positioning method based on object detection results of plural stereo cameras, comprising:
   obtaining, when each of the plural stereo cameras continuously carries out tracking and detection with respect to each of objects, positional information of the corresponding object;
   generating, based on the positional information of the corresponding object, a trajectory of the corresponding object; and
   carrying out a merging process with respect to the trajectories generated corresponding to the plural stereo cameras so as to determine at least one object position, wherein the step of carrying out the merging process includes
   (a) creating, for each of the plural stereo cameras, a trajectory list, and storing the respective trajectories generated corresponding to this stereo camera in the corresponding trajectory list;
   (b) selecting a trajectory from the corresponding trajectory list, and comparing the selected trajectory with other trajectories stored in other trajectory lists so as to find at least one trajectory from the other trajectory lists which matches the selected trajectory;
   (c) removing, when the at least one trajectory which matches the selected trajectory is found, the selected trajectory and the at least one trajectory which matches the selected trajectory from the corresponding trajectory list and the other trajectory lists, and carrying out a combination process with respect to newest positional information of the selected trajectory and the at least one trajectory so as to determine a position of the corresponding object;
   (d) removing, when the at least one trajectory which matches the selected trajectory is not found, the selected trajectory from the corresponding trajectory list, and determining a position of the corresponding object based on newest positional information of the selected trajectory; and
   (e) carrying out the steps (a) to (d) repeatedly until the respective trajectory lists are empty.

2. The object positioning method according to claim 1, wherein:
   the positional information of the corresponding object includes timestamps, an object index, and positional coordinates corresponding to the timestamps.

3. The object positioning method according to claim 2, wherein, the step of generating, based on the positional information of the corresponding object, a trajectory of the corresponding object includes:
   predetermining timestamps for resampling;
   calculating, by carrying out interpolation with respect to the obtained positional information, positional information at the predetermined timestamps of the corresponding object; and
   creating, based on the predetermined timestamps and the positional information corresponding to the predetermined timestamps, the trajectory of the corresponding object.

4. The object positioning method according to claim 2, wherein, the step of generating, based on the positional information of the corresponding object, a trajectory of the corresponding object includes:
   predetermining a time period corresponding to the trajectory to be generated;
   cutting out, from the obtained positional information, positional information of the corresponding object in the time period; and
   creating, by using the positional information cut out from the obtained positional information, the trajectory of the corresponding object.

5. The object positioning method according to claim 4, wherein:
   a start time point and an end time point of the time period are newest timestamps, respectively.

6. The object positioning method according to claim 5, wherein the step of carrying out the merging process with respect to the trajectories generated corresponding to the plural stereo cameras so as to determine object positions includes:
   carrying out a matching process with respect to the generated trajectories corresponding to the plural stereo cameras so as to determine, for each object, at least one matched trajectory of the corresponding object;
   carrying out, when the corresponding object has the at least one matched trajectory, a combination process with respect to newest positional information of the selected trajectory and the at least one matched trajectory of the corresponding object so as to determine a position of the corresponding object; and
   determining, when the corresponding object does not have the at least one matched trajectory, the position of the corresponding object based on newest position information of the corresponding object.

7. The object positioning method according to claim 6, wherein:
   whether or not two trajectories are matched is determined based on correlation of the two trajectories.

8. The object positioning method according to claim 5, wherein:
   whether or not two trajectories are matched is determined based on correlation of the two trajectories.

9. An object positioning device based on object detection results of plural stereo cameras, comprising:
   processing circuitry configured to obtain, when each of the plural stereo cameras continuously carries out tracking and detection with respect to each of objects, positional information of the corresponding object;

generate, based on the positional information of the corresponding object, a trajectory of the corresponding object; and carry out a merging process with respect to the trajectories generated corresponding to the plural stereo cameras so as to determine at least one object position, wherein the processing circuitry is further configured to carry out the merging process by (a) creating, for each of the plural stereo cameras, a trajectory list, and storing the respective trajectories generated corresponding to this stereo camera in the corresponding trajectory list;

(b) selecting a trajectory from the corresponding trajectory list, and comparing the selected trajectory with other trajectories stored in other trajectory lists so as to find at least one trajectory from the other trajectory lists which matches the selected trajectory;

(c) removing, when the at least one trajectory which matches the selected trajectory is found, the selected trajectory and the at least one trajectory which matches the selected trajectory from the corresponding trajectory list and the other trajectory lists, and carrying out a combination process with respect to newest positional information of the selected trajectory and the at least one trajectory so as to determine a position of the corresponding object;

(d) removing, when the at least one trajectory which matches the selected trajectory is not found, the selected trajectory from the corresponding trajectory list, and determining a position of the corresponding object based on newest positional information of the selected trajectory; and (e) carrying out the steps (a) to (d) repeatedly until the respective trajectory lists are empty.

10. The object positioning device according to claim 9, wherein:

the positional information of the corresponding object includes timestamps, an object index, and positional coordinates corresponding to the timestamps.

11. The object positioning device according to claim 10, wherein the processing circuitry is further configured to:

predetermine timestamps for resampling;

calculate, by carrying out interpolation with respect to the obtained positional information, positional information at the predetermined timestamps of the corresponding object; and create, based on the predetermined timestamps and the positional information corresponding to the predetermined timestamps, the trajectory of the corresponding object.

12. The object positioning device according to claim 10, wherein the processing circuitry is further configured to:

predetermine a time period corresponding to the trajectory to be generated;

cut out, from the obtained positional information, positional information of the corresponding object in the time period; and create, by using the positional information cut out from the obtained positional information, the trajectory of the corresponding object.

13. The object positioning device according to claim 12, wherein:

a start time point and an end time point of the time period are newest timestamps, respectively.

14. The object positioning device according to claim 13, wherein the processing circuitry is further configured to:

carry out a matching process with respect to the generated trajectories corresponding to the plural stereo cameras so as to determine, for each object, at least one matched trajectory of the corresponding object;

carry out, when the corresponding object has the at least one matched trajectory, a combination process with respect to newest positional information of the selected trajectory and the at least one matched trajectory of the corresponding object so as to determine a position of the corresponding object; and determine, when the corresponding object does not have the at least one matched trajectory, the position of the corresponding object based on newest position information of the corresponding object.

15. The object positioning device according to claim 14, wherein:

whether or not two trajectories are matched is determined based on correlation of the two trajectories.

16. The object positioning device according to claim 13, wherein:

whether or not two trajectories are matched is determined based on correlation of the two trajectories.

* * * * *